(12) United States Patent
Lindner

(10) Patent No.: US 6,580,567 B1
(45) Date of Patent: Jun. 17, 2003

(54) PANORAMIC REFRACTING CONICAL OPTIC

(75) Inventor: Jeffrey L. Lindner, Madison, AL (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/173,410

(22) Filed: Jun. 17, 2002

Related U.S. Application Data

(62) Division of application No. 09/616,624, filed on Jul. 28, 2000, now Pat. No. 6,424,470.

(51) Int. Cl.⁷ .............................................. G02B 13/06
(52) U.S. Cl. ....................................... 359/725; 359/726
(58) Field of Search ........................ 359/725, 726–729, 359/364, 402–403, 537, 618; 348/36–39

(56) References Cited

U.S. PATENT DOCUMENTS

| | | | | |
|---|---|---|---|---|
| 4,114,592 A | * | 9/1978 | Winston | 126/683 |
| 4,767,172 A | * | 8/1988 | Nichols et al. | 385/146 |
| 4,770,514 A | * | 9/1988 | Silverglate | 359/728 |
| 5,969,790 A | * | 10/1999 | Onufryk | 351/175 |
| 6,272,267 B1 | * | 8/2001 | Hansler et al. | 385/43 |

* cited by examiner

*Primary Examiner*—Jordan M. Schwartz
(74) *Attorney, Agent, or Firm*—James J. McGroary

(57) ABSTRACT

An optical device having a semi-spherical or hemispherical field-of-view is provided. A conically-shaped piece of optical material has an annular surface satisfying Snell's Law for total internal reflection with respect to light passing through the piece and incident on the annular surface from within the piece.

2 Claims, 3 Drawing Sheets

PANORAMIC REFRACTING CONICAL OPTIC

This application is a division of application Ser. No. 09/616,624 filed on Jul. 28, 2000 now U.S. Pat. No. 6,424,470.

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to optical devices. More specifically, the invention is an optical device capable of achieving a semi-spherical or hemispherical field-of-view.

2. Description of the Related Art

Imaging or illuminating cylindrical, semi-spherical or hemispherical scenes is generally accomplished using a plurality of angular field-of-view cameras/lenses positioned to characterize the necessary field-of-view. Typically, the angular field-of-view of each camera/lens is on the order of 120° or less. Thus, multiple cameras/lenses are required to simultaneously view or illuminate, for example, the traffic flow at an intersection, the entire area surrounding a vehicle or structure, or the interior of a room or other structure.

A solution to this problem is a camera/lens having the ability to image or illuminate annularly thereabout, i.e., over an entire 360° field-of-view. One such device is a panoramic annular lens (PAL) available commercially from Optechnology Incorporated, Gurley, Ala. The PAL provides a cylindrical or flat annular image about an observation point. A two-dimensional diametrical view of the PAL is shown in FIG. 1 and is referenced generally by 10. Accordingly, the three-dimensional solid structure of a PAL can be visualized by rotating PAL 10 about the Z-axis which passes through the central axis of PAL 10.

The two-dimensional representation of the flat annular image plane of PAL 10 is represented by lines 12 and 14. That is, PAL 10 can be used to image objects on either of lines 12 and 14. For example, the image path for an object on line 12 is indicated by path lines 16A–16D. Path 16A indicates light traveling from line 12 (e.g., the surface of a cylindrical object) to a convex surface 10A of PAL 10. Path 16B indicates refracted light traveling from convex surface 10A through PAL 10 to a convex surface 10B. Convex surface 10B is internally reflective so that path 16C indicates reflected light traveling from the reflective convex surface 10B through PAL 10 to a reflective concave surface 10C. Path 16D indicates reflected light traveling from concave surface 10C through PAL 10 to a flat clear surface 10D, at which point light exits PAL 10. Note that a similar set of path lines could be drawn for an object on line 14 with light entering PAL 10 at convex surface 10E and being reflected at convex surface 10F.

Unfortunately, the three-dimensional realization of a lens based on the two-dimensional diametrical geometry of PAL 10 is difficult to machine with acceptable tolerances. Thus, the PAL based on the two-dimensional geometry described above is limited to use in expensive systems that can tolerate its high-cost of precision manufacturing. Further, the PAL's forward-looking angular resolution along the Z-axis is limited due to the presence of concave surface 10C.

SUMMARY OF THE INVENTION

Accordingly, it is an object of the present invention to provide an optical device capable of being used to image or illuminate a 360° field-of-view.

Another object of the present invention is to provide an optical device having a field-of-view that is semi-spherical or hemispherical.

Still another object of the present invention is to provide a 360° field-of-view optical device of simple construction.

Other objects and advantages of the present invention will become more obvious hereinafter in the specification and drawings.

In accordance with the present invention, an optical device has at least a semi-spherical field-of-view. The device comprises a conically-shaped piece of optical material having an annular surface satisfying Snell's Law for total internal reflection with respect to light passing through the piece and incident on the annular surface from within the piece. The annular surface is symmetric about the device's longitudinal axis with its exterior being concave.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
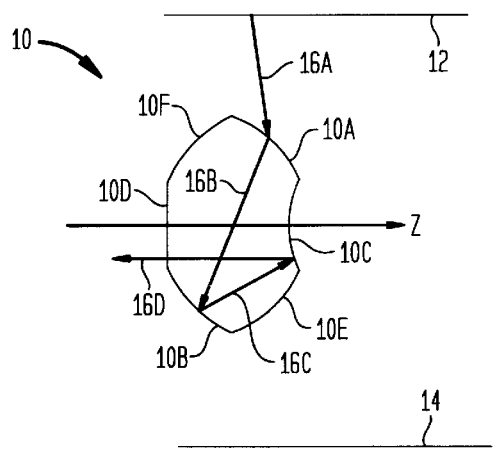
FIG. 1 is a two-dimensional diametrical view of a prior art panoramic annular lens (PAL) illustrating the path of light movement therethrough.
Figure 2:
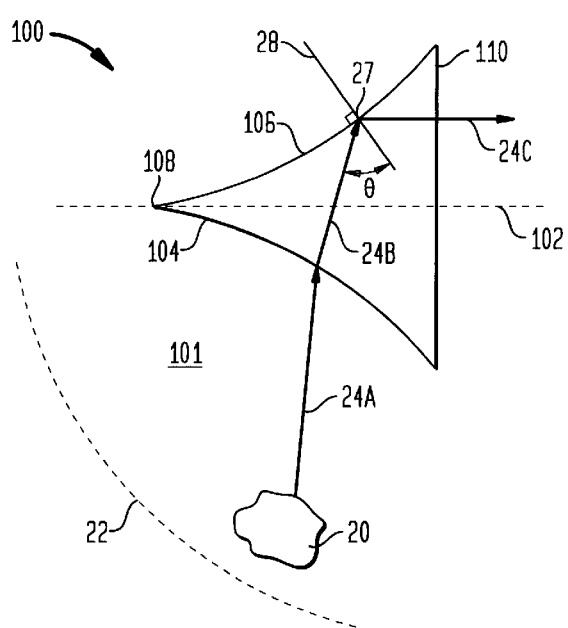
FIG. 2 is a two-dimensional diametrical view of the panoramic refracting optic according to the present invention illustrating the path of light movement therethrough.

Referring again to the drawings, and more particularly to FIG. 2, a two-dimensional diametrical view of an embodiment of a panoramic refracting optic according to the present invention is shown and referenced generally by numeral 100. That is, the three-dimensional solid structure of the optic is achieved by rotating the view in FIG. 2 about the longitudinal axis 102 of optic 100. Accordingly, the present invention is a solid, conically-shaped, three-dimensional structure. Optic 100 is made from any optical material that permits the passage of light therethrough. Suitable materials include, but are not limited to, quartz glass, plexiglass, flint glass, boron glass, diamond, or any other optical material suitable for use in the manufacturing of lenses.

In the description to follow, optic 100 will be explained for its use in imaging objects lying in a semi-spherical or hemispherical scene about optic 100. However, it is to be understood that optic 100 could also be used to illuminate objects in this same scene simply by supplying light energy in the reverse direction of the imaging light paths. Accordingly, optic 100 can be used by itself or in conjunction with a camera or display device (not shown) for purpose of imaging, or could be used in conjunction with a light source (not shown) for purpose of illumination.

A conically-shaped annular portion of optic 100 is represented in FIG. 2 by concave surfaces 104 and 106 which meet at a vertex 108 and terminate at a flat face 110 opposite vertex 108. While the shape of surfaces 104 and 106 are identical, the particular geometry thereof can vary. For example, surfaces 104 and 106 could be defined by the arc of a circle, a parabola, an ellipse, etc., as long as the following criteria are met. The criteria will be explained by describing the movement of light through optic 100.

An object 20 to be imaged lies on a semi-spherical region defined by dashed line 22. Light reflected by object 22 travels along path 24A in a transmission medium 101 (e.g., air, water, etc.) and is incident upon the outer portion of surface 104. The light refracts slightly and travels along path 24B through optic 100 and is incident on the inner portion of surface 106 at a point of incidence 27 of light. A surface normal 28 is defined. Surfaces 104 and 106 are shaped such that light passing through optic 100 and incident on surface 104 or 106 (i.e., the conically-shaped annular portion of optic 100) will be totally internally reflected. In the illustrated example, this means that light traveling along path 24B is totally internally reflected at point 27 towards flat face 110 along path 24C. Note that light along path 24C is slightly refracted at as it exits flat face 110. However, the amount of refraction is small because the surface normal and light path are nearly aligned. Therefore, the refraction at face 110 does not affect the function of optic 100.

To achieve total internal reflection at the inner portion of surfaces 104 and 106, Snell's Law for total internal reflection must be satisfied all along surfaces 104 and 106. That is, the angle θ between path 24B at point of incidence 27 and surface normal 28 must be greater than the critical angle $\theta_c$ defined by Snell's Law which states $$\sin \theta_c = (n_1/n_2) \quad (1)$$

where $n_1$ is the index of refraction for transmission medium 101, and $n_2$ is the index of refraction of the material used for optic 100.

Thus, for total internal reflection, $$\theta > \theta_c \quad (2)$$

or $$\theta > \sin^{-1}(n_1/n_2) \quad (3)$$

Figure 3:
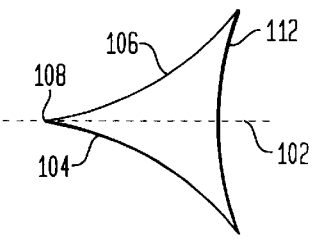
FIG. 3 illustrates another embodiment of the present invention having a concave end face.
Figure 4:
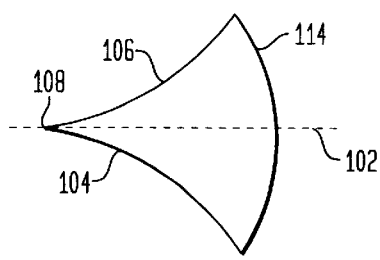
FIG. 4 illustrates another embodiment of the present invention having a convex end face.
Figure 5:
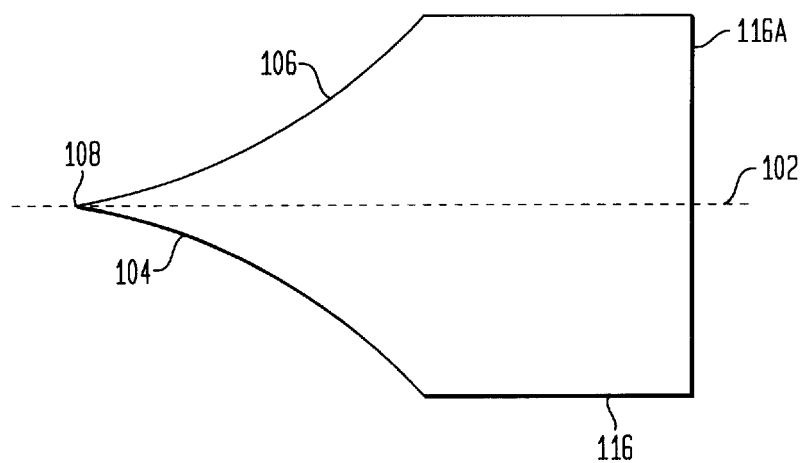
FIG. 5 illustrates another embodiment of the present invention having a cylindrical extension with a flat outboard end.
Figure 6:
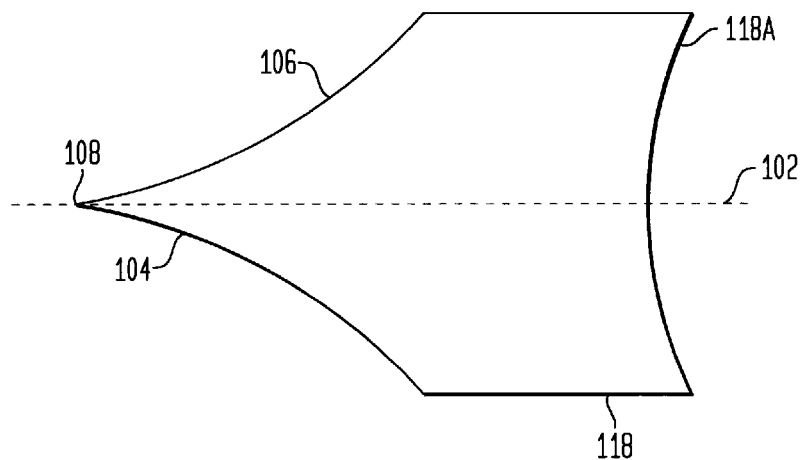
FIG. 6 illustrates another embodiment of the present invention having a cylindrical extension with a concave outboard end.
Figure 7:
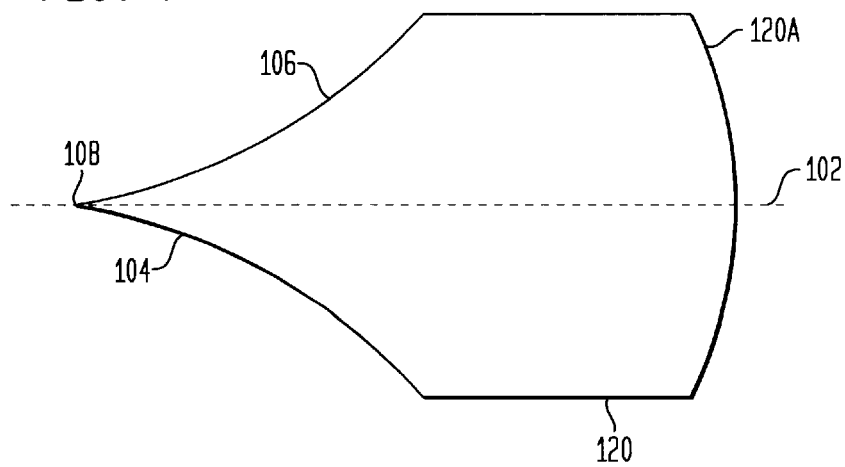
FIG. 7 illustrates another embodiment of the present invention having a cylindrical extension with a convex outboard end.

The present invention is not limited to the specific construction described for optic 100. For example, the end face (i.e., face 110) need not be flat, but could be a concave face 112 (FIG. 3) or a convex face 114 (FIG. 4). Shaping of the end face can be used to tailor the exiting (or entering in the case of illumination) light path for a particular application. Still further, the conically-shaped annular portion of the optic could have a cylindrically-shaped piece of optical material optically coupled thereto (i.e., integral therewith) as shown in FIGS. 5, 6 and 7. In FIG. 5, a cylindrical portion 116 having an outboard end with a flat face 116A extends from the conically-shaped annular portion defined by surfaces 104 and 106. In FIG. 6, a cylindrical portion 118 having an outboard end with a concave face 118A extends from the conically-shaped annular portion defined by surfaces 104 and 106. In FIG. 7, a cylindrical portion 120 having an outboard end with a convex face 120A extends from the conically-shaped annular portion defined by surfaces 104 and 106. The inclusion of the cylindrical portion provides a means for holding the optic during the manufacturing and use thereof.

Figure 8:
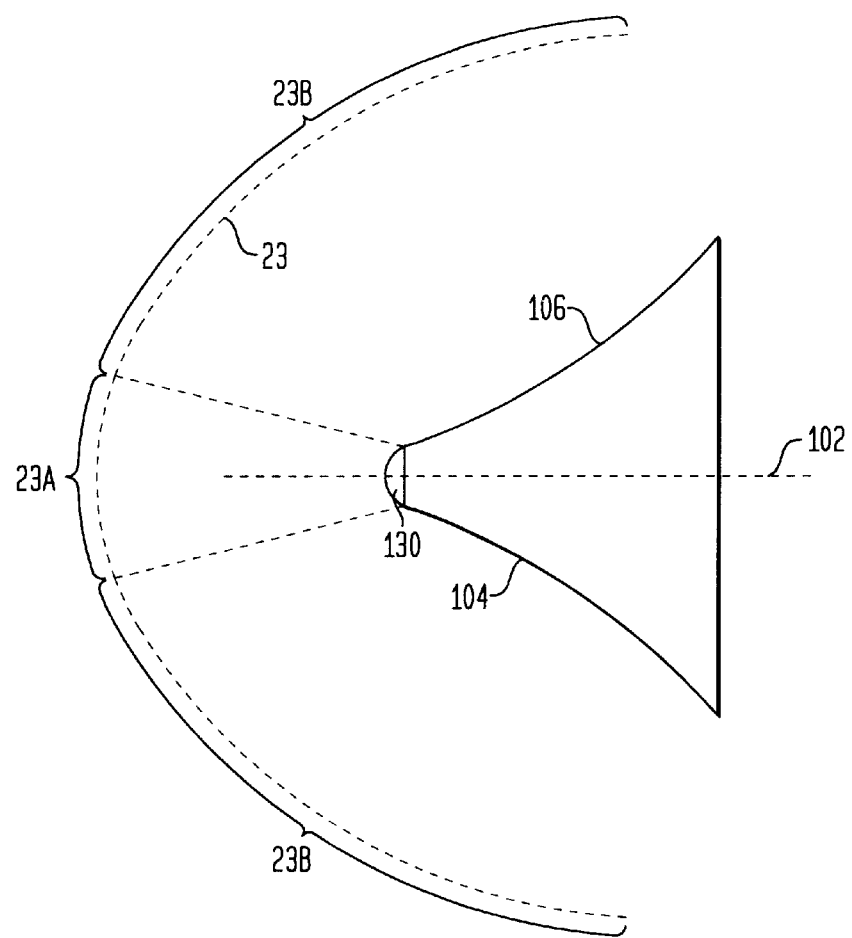
FIG. 8 illustrates another embodiment having of the present invention an aperture with a field-of-view along the optic's longitudinal axis.
Figure 9:
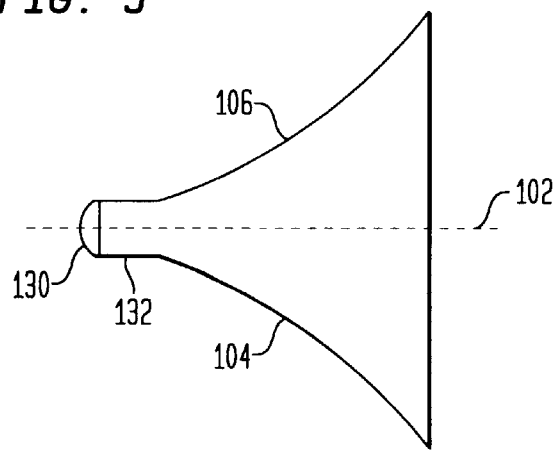
FIG. 9 illustrates still another embodiment of the present invention having an aperture with a field-of-view along the optic's longitudinal axis.

In each of the above-described embodiments, the optic's conically-shaped annular portion defined by surfaces 104 and 106 terminates in vertex 108. However, in situations where a full hemispherical field-of-view is needed, an optical aperture defining a field-of-view along the optic's longitudinal axis can be incorporated into the optic of the present invention. For example, in FIG. 8, a clear aperture or lens 130 is incorporated into the tip of the conically-shaped annular portion defined by surfaces 104 and 106. Aperture 130 could also be incorporated on the end of a cylindrical extension 132 as shown in FIG. 9. Aperture 130 has a field-of-view along longitudinal axis 102 so that a hemispherical region defined by dashed line 23 can be imaged or illuminated. More specifically, the field-of-view of the conically-shaped annular portion defined by surfaces 104 and 106 might be in the semi-spherical region 23B. Note that any embodiment including aperture 130 can have a flat end face 110, a concave face 112 as in FIG. 3, a convex face 114 as in FIG.4, a cylindrical portion 116 as in FIG. 5, a cylindrical portion 118 as in FIG. 6, or a cylindrical portion 120 as in FIG. 7.

The advantages of the present invention are numerous. The optic can image or illuminate a semi-spherical or hemispherical region thereabout. The conically-shaped optical can be constructed easily as it is a simple geometry to machine.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by letters patent of the united states is:

What is claimed is:

1. An optical device comprising a conically-shaped piece of optical material having an annular surface satisfying Snell's Law for total internal reflection with respect to light passing through said conically-shaped piece to be incident on said annular surface, wherein said optical device has at least a semi-spherical field-of-view, wherein said conically-shaped piece terminates longitudinally at a first end thereof in a vertex and in a second end opposite said first end;

a cylindrical piece of optical material optically coupled to said second end, said cylindrical piece extending to an outboard end thereof and defines a convex surface at said outboard end.

2. An optical device comprising a conically-shaped piece of optical material having an annular surface satisfying Snell's Law for total internal reflection with respect to light passing through said conically-shaped piece to be incident on said annular surface, wherein said optical device has at least a semi-spherical field-of-view, wherein said conically-shaped piece terminates longitudinally at a first end thereof and in a second end opposite said first end;

an optical lens optically coupled to said first end, said optical lens having a field-of-view that is substantially forward of said first end;

a cylindrical piece of optical material optically coupled to said second end of said conically-shaped piece, said cylindrical piece extending to an outboard end thereof, wherein said cylindrical piece defines a convex surface at said outboard end.

* * * * *